United States Patent
Frank et al.

(10) Patent No.: US 8,750,071 B2
(45) Date of Patent: Jun. 10, 2014

(54) SENSOR FUNCTION FOR CONTROLLING AT A VARIABLE TRANSMISSION FREQUENCY FOR THE PURPOSE OF DETECTING CONTAMINATION

(75) Inventors: Michael Frank, Bretten (DE); Peter Preissler, Dorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 777 days.

(21) Appl. No.: 12/734,756

(22) PCT Filed: Oct. 14, 2008

(86) PCT No.: PCT/EP2008/063751
§ 371 (c)(1),
(2), (4) Date: Sep. 13, 2010

(87) PCT Pub. No.: WO2009/074369
PCT Pub. Date: Jun. 18, 2009

(65) Prior Publication Data
US 2010/0329080 A1    Dec. 30, 2010

(30) Foreign Application Priority Data

Dec. 12, 2007   (DE) .......................... 10 2007 059 908

(51) Int. Cl.
*G01S 15/00*   (2006.01)
*G01V 13/00*   (2006.01)

(52) U.S. Cl.
USPC ........................................................ 367/13

(58) Field of Classification Search
USPC ........................................................ 367/13
See application file for complete search history.

(56) References Cited

U.S. PATENT DOCUMENTS

| | | | |
|---|---|---|---|
| 4,275,363 A | | 6/1981 | Mishiro et al. |
| 5,991,234 A | * | 11/1999 | Sejalon et al. ................. 367/13 |
| 6,040,765 A | | 3/2000 | Cherry et al. |
| 2009/0251990 A1 | | 10/2009 | Preissler |
| 2010/0329080 A1 | * | 12/2010 | Frank et al. ..................... 367/99 |

FOREIGN PATENT DOCUMENTS

| | | |
|---|---|---|
| DE | 101 21 519 | 5/2002 |
| DE | 10 2005 038 649 | 2/2007 |
| DE | 10 2005 057 973 | 6/2007 |
| WO | WO 2007/019907 | 2/2007 |

* cited by examiner

Primary Examiner — Daniel Pihulic
(74) Attorney, Agent, or Firm — Kenyon & Kenyon LLP

(57) ABSTRACT

In a method for functional testing of a mechanical vibration sensor, a vibration signal is generated on the vibration component of the vibration sensor with the aid of a periodic excitation signal, the frequency of which excitation signal is varied, and a post-vibration process of the vibration component of the vibration sensor is analyzed once the excitation signal has been switched off.

14 Claims, 2 Drawing Sheets

SENSOR FUNCTION FOR CONTROLLING AT A VARIABLE TRANSMISSION FREQUENCY FOR THE PURPOSE OF DETECTING CONTAMINATION

BACKGROUND OF THE INVENTION

1. Field of the Invention

The present invention relates to a method for functional testing of a mechanical vibration sensor, and to a measuring system for detecting obstacles on a motor vehicle having functional testing.

2. Description of Related Art

Sensor systems for measuring the distance of obstacles, particularly with the aid of ultrasonic sensors, are known from published German patent document DE 10 2005 057 973 and also from U.S. Pat. No. 6,040,765, for instance. In such systems the sensor generates a sound pulse which travels away from the sensor at the propagation rate of the particular medium (usually air), is reflected by an obstacle, and the reflection is then detected by the sensor, whereupon the distance to the obstacle is able to be calculated from the resulting propagation time and the known propagation rate. This distance measurement according to the so-called pulse-echo method requires a periodic excitation of a vibrating component of a vibration sensor. In most cases the excitation of a diaphragm is used on which a piezo element is mounted, the excitation signal defining the frequency of the emitted signal pulse. The reflected pulse is then detected using the same sensor or a different sensor, so that the propagation time is able to be determined from the time interval between the emission of the pulse and the detection of the reflected pulse.

Such measuring systems basically have the inherent problem that no reflected signal is returned to the sensor unit if no obstacles are located in the signal path. A self-test routine for such system is therefore of great importance for ensuring the function of the distance determination or the obstacle detection.

Self-test routines for ultrasonic distance sensors in which reference obstacles such as the ground surface are utilized for generating self-test signals are known from the related art, e.g., published German patent document DE 10 2005 057 973 A1. In those cases it is problematic that the corresponding reference obstacles may change continuously, which means that no clearly reproducible reference signals are available for evaluation.

Another possibility for generating reference test signals is the evaluation of a post-oscillation process of the vibrating component of the vibration sensor, as described in U.S. Pat. No. 6,040,765.

A vibrating sensor with its vibrating component according to the present invention constitutes a harmonic oscillator, which is excited into a forced damped mechanical vibration at the frequency of the excitation signal and preferably at a defined amplitude, using a periodic excitation signal. Depending on its mechanical specifications, a harmonic oscillator has a resonant frequency at which, when being used as excitation frequency, the maximum amplitude is reached in relation to the excitation amplitude. The resonant frequency of a mechanical harmonic oscillator scales reciprocally to the radical of the mass of the vibrating component. To achieve high signal strength, it is therefore advantageous to excite a harmonic oscillator, in this case, the vibrating component of the vibration sensor, at a frequency in the region of the resonant frequency of the harmonic oscillator.

If the periodic excitation signal of a harmonic oscillator is switched off, then the vibrational energy stored in the oscillator is compensated by the damping, such that the oscillator vibration decreases across a decay process. This decay process, the end of which results in the vibration amplitude of zero, will be described in greater detail in the following text.

In the decay process, the harmonic oscillator is vibrating freely, i.e., without being excited into a forced vibrations by an excitation signal, with the result that during the decay process the harmonic oscillator approaches the mechanically specified resonant frequency of the free harmonic oscillator in its oscillation frequency. This decay process is referred to as post-vibration and is directly detectable by the vibration sensor, so that control over the function of the vibration sensor, particularly over the function of the emitted vibration pulse, is able to be obtained. This is attributable to the fact that such vibration sensors are predominantly realized using piezo ultrasonic sensors, so that a vibration component simultaneously may be used as transmitter and as receiver for a corresponding vibration pulse. As soon as the excitation signal is switched off, the sensor is therefore able to be switched into the detection mode so that the post-vibration signal is able to be tapped directly at the sensor as measuring signal.

Such vibration sensors do indeed provide direct feedback regarding their function or the accomplished emission of a sound pulse, but they do not provide any information about the quality of the harmonic oscillator or about a possible change in the operating state, beyond the basic emission of a pulse.

Therefore, it is an object of the present invention to provide a self-test routing and a measuring system for obstacle detection having a self-test routine, which provides detailed information about the state of the vibration component or the vibration sensor within the framework of a self-test routine.

BRIEF SUMMARY OF THE INVENTION

The method according to the present invention for functional testing of a mechanical vibration sensor, in particular an ultrasonic sensor, utilizes the evaluation of the post-vibration process of the vibrating component of the vibration sensor as a function of a variation of the excitation frequency, preferably using the same excitation amplitude, for generating a vibration signal. Once the excitation has been switched off, the vibration component still executes post-vibrations. If the excitation frequency is then varied, i.e., if it is selected to be closer to the region of the resonant frequency or farther away from the region of the resonant frequency than the usual operating excitation frequency, then a different behavior of the post-vibration process is to be expected, which is able to be subjected to a more detailed analysis.

As already mentioned, the resonant frequency of a harmonic oscillator behaves in a manner that is inversely proportional to the radical of its mass, which means that additional mass components such as contamination or ice on the vibration sensor, for example, cause detuning of the harmonic oscillator (vibration component), and the resulting resonant frequency consequently deviates from the originally uninfluenced resonant frequency of the harmonic oscillator. Notwithstanding an increase in mass, certain contamination may produce a change in the properties of the diaphragm to the effect that the resonant frequency rises if, for example, the elastic properties of the vibration component are affected by the contamination. This contamination must be differentiated from a pure increase in mass. Such a change may occur at a particular degree of icing up, for example. Aging of the vibration component, such as aging of the vibrating diaphragm of a piezo vibration component, for instance, has similar effects on the resonant frequency and the form of the post-vibration process.

The core of the present invention is the realization of a sensor self-test function, which makes it possible to excite the vibration sensor into periodic vibrations at various frequencies, and to perform an analysis of the post-vibration process as a function of the excitation frequency.

In one example embodiment, the variation of the periodic excitation signal is implemented in the range of the natural frequency, i.e., the resonant frequency of the vibration component, based on a previously determined resonant frequency of the vibration sensor.

The self-test routine of the vibration sensor may be performed at varying excitation frequencies both during normal operation, i.e., either between the distance measuring routines or within the framework of a distance measuring routine, that is to say, also outside of a normal operation, particularly in a special test mode for the vibration sensor.

The analysis data that may result from the analysis of the post-vibration process are particularly the duration of the post-vibration process and the analysis of the amplitude characteristic of the post-vibration process. Furthermore, there is the option of using the post-vibration process to determine the instantaneous, possibly changed natural frequency of the vibration component. From the analysis of the natural frequency, that is to say, the resonant frequency of the free, damped vibration, it is possible to derive information about a possible increase in mass resulting from contamination etc., or information about an improved excitation possibility because the excitation of a harmonic oscillator at its resonant frequency makes it possible to achieve the largest possible vibration amplitude, and thus the strongest signal in relation to the excitation. Determining the resonant frequency requires a Fourier analysis of the vibration characteristic of the post-vibration. The analysis of the duration and the amplitude characteristic of the post-vibration process also provides information about the relationship between the amplitude of the excitation signal and the amplitude of the free vibration, which makes it possible, for instance, to obtain information about the efficiency of the excitation. The duration of the post-vibration process provides information about the inertia of the vibration component, which in turn makes it possible to infer changes in the vibration component.

In addition to the method for functional testing of a mechanical vibration sensor, a measuring system for obstacle detection on a motor vehicle is provided as well, which utilizes the effects used in the previously described method for functional testing of the measuring system.

Also conceivable in principle is a distance measuring system for obstacle detection in which the complete pulse-echo method is implemented for measuring the distance at varying periodic excitation frequencies for the vibration sensors.

DETAILED DESCRIPTION OF THE INVENTION

Figure 1:
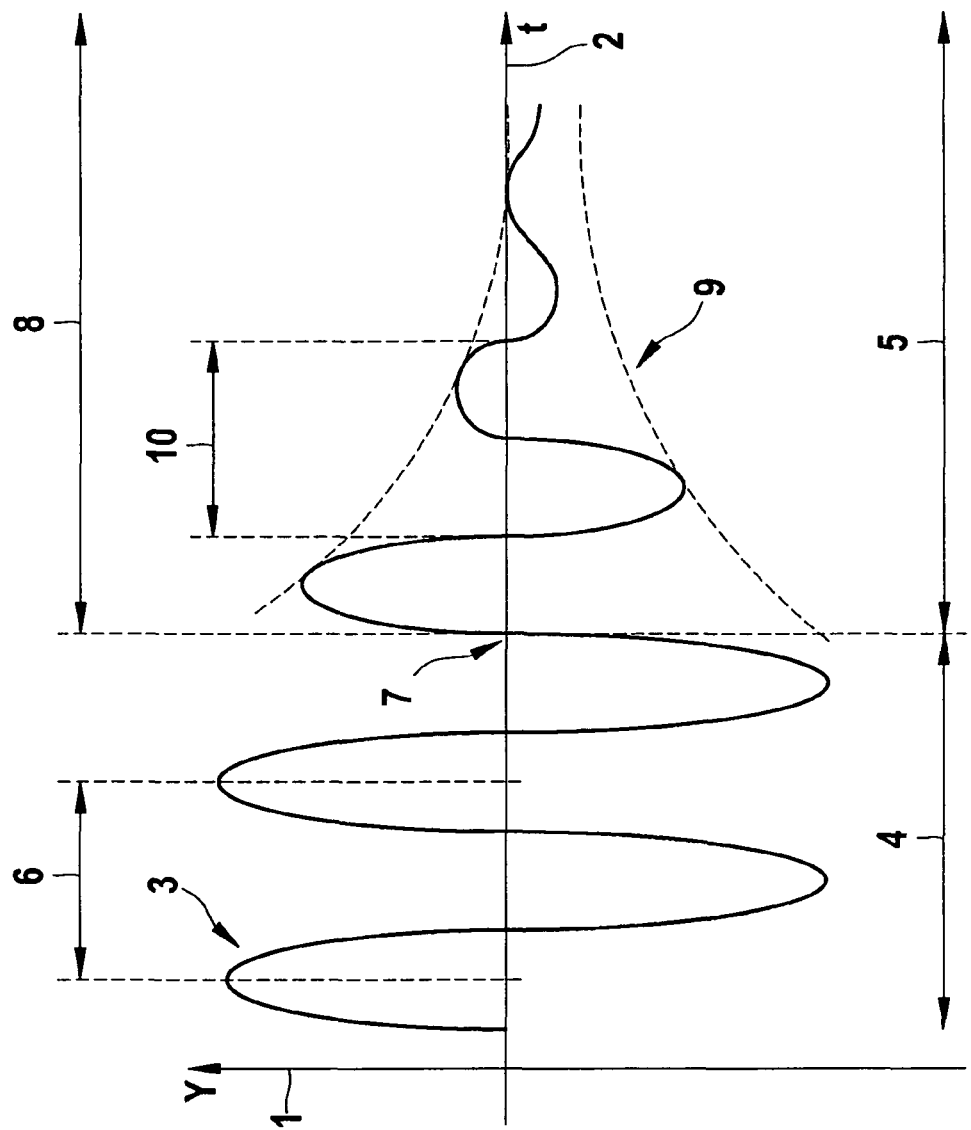
FIG. 1 shows the amplitude time characteristic of a vibration pulse of a vibration component of a vibration sensor.

FIG. 1 shows the amplitude time characteristic of a vibration pulse of a vibration component of the vibration sensor, in which deflection Y of the vibration component from its neutral position (1) has been plotted over time axis (2) as signal characteristic (3). The amplitude time characteristic is subdivided into the regions of the excitation (4) and the region of the post-vibration process (5). The vibration component is excited by a periodic excitation signal having period duration (6) for the forced vibration at a given unvarying amplitude. In the process, the harmonic oscillator, i.e., the vibration component, vibrates at the frequency of the excitation signal (reciprocal value of the period duration of the excitation) and thus executes a damped mechanical vibration.

After the excitation signal has been switched off, i.e., at instant (7), the harmonic oscillator vibrates freely. Because of the provided damping, the vibration amplitude decreases along region (8) during the post-oscillation process (5), until the vibration amplitude has dropped to zero at the end of region (8). The envelope of post-vibration process (9) reproduces the amplitude characteristic of the post-vibration process, which in turn allows inferences regarding the provided damping of the oscillator. The period duration (10) of the free vibration of the post-vibration process may be used to determine the frequency of the post-vibration process by means of an analysis, e.g., by Fourier transformation, which frequency corresponds to the natural frequency of the free harmonic oscillator.

In a piezo ultrasonic sensor, the piezoelectric voltage, which voltage is generated by the piezo crystal due to the inertia of the vibration component, may be analyzed directly for the purpose of detecting the post-vibration process at the time when excitation signal (7) is switched off.

Figure 2A:
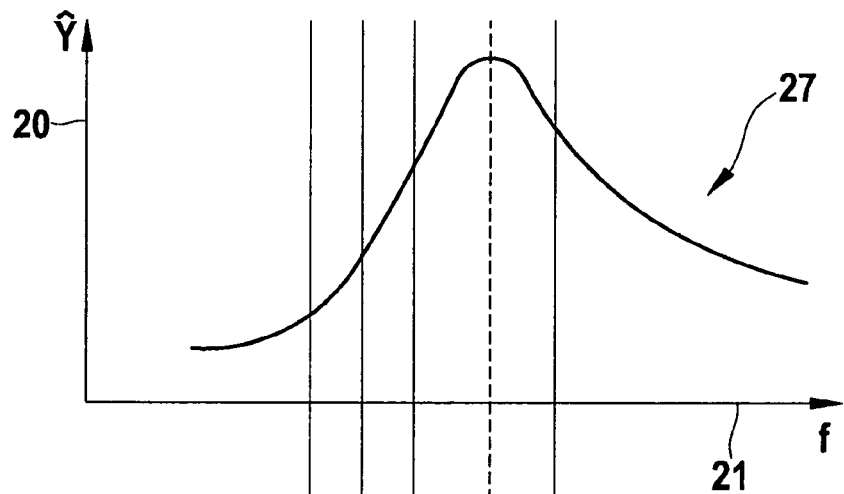
FIG. 2a shows the resonance curve of the harmonic oscillator without additional mass.
Figure 2B:
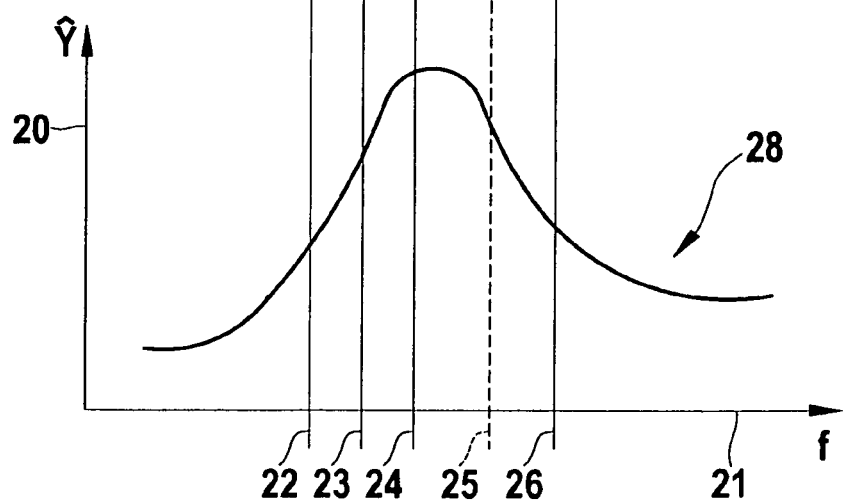
FIG. 2b shows the resonance curve of the vibration component having additional mass.

FIGS. 2a and 2b show two resonance curves, in which the achieved vibration amplitude of the vibration component (20) as a function of the used excitation frequency (21) has been plotted. Representative of the possible excitation frequencies, five excitation frequencies (22)-(26) are illustrated in FIGS. 2a and 2b, which result in different vibration amplitudes.

FIG. 2a shows the resonance curve of the harmonic oscillator without additional mass (27), whose resonant frequency comes about at the excitation frequency (25), shown in the form of a dashed line there. If this oscillator were excited at frequencies (24) or (26), then no difference would be noticed between excitation (24) and excitation (26) in the post-vibration process, but a difference with respect to excitation (25). In an excitation at frequencies (22) or (23), however, a marked decrease in the generated vibration amplitude would be observed, which corresponds to a departure from the resonant frequency specified by the system.

In FIG. 2b, the resonance curve of the vibration component having additional mass (28) is shown, the resonant frequency of the vibration component now having shifted toward a frequency (24). If this oscillator is excited at frequencies (23) or (25), then the given resonant frequency lies in-between. Via an excitation at frequencies (22) or (26), it is possible to obtain information about the state of the harmonic oscillator in the case of FIG. 2b as well.

If the determined resonant frequencies and the vibration behavior of the various oscillator states at different excitation frequencies from FIGS. 2a and 2b are now compared to each other, then inferences are possible with regard to possible changes of the vibration component of the harmonic oscillator, FIG. 2b showing the change due to an increase in mass by way of example. Evaluations of other information from the post-vibration process, such as the envelope of amplitude characteristic (9) or the length of the post-vibration process (8), also may provide information about changes of the vibration component of the sensor, so that, for example, aging or other types of detuning of the harmonic oscillator are detected and able to be taken into account with respect to the control, in order to generate and evaluate the measuring signal. In addition, reports or warnings may be output to the user of the system in the case of a malfunction.

What is claimed is:

1. A method for functional testing of a mechanical vibration sensor, comprising:
    generating a vibration signal on a vibration component of the vibration sensor with the aid of a periodic excitation signal wherein the frequency of the periodic excitation signal is varied; and
    analyzing a post-vibration process of the vibration component of the vibration sensor once the excitation signal has been switched off, wherein the method is implemented during the normal operation of the vibration sensor within a framework of a distance measuring routine.

2. The method as recited in claim 1, wherein the variation of the frequency of the periodic excitation signal lies within the range of the natural frequency of the vibration component of the vibration sensor.

3. The method as recited in claim 2, wherein the method is implemented in a test mode of the vibration sensor.

4. The method as recited in claim 2, wherein the method is implemented while analyzing the natural frequency of the vibration component of the vibration sensor.

5. The method as recited in claim 2, wherein the method is implemented while analyzing the duration of the post-vibration process of the vibration component of the vibration sensor.

6. The method as recited in claim 2, wherein the method is implemented while analyzing the amplitude characteristic of the post-vibration process of the vibration component of the vibration sensor.

7. A measuring system for a motor vehicle having functional testing, comprising:
    at least one ultrasonic sensor unit; and
    signal generator configured to generate a periodic function test signal as signal for a vibration component of the sensor unit, wherein the function test signal is variable in its frequency, wherein the function test is performed during the normal operation of the sensor unit within a framework of a distance measuring routine.

8. The measuring system as recited in claim 7, wherein the variation of the frequency of the function test signal lies within the range of the natural frequency of the vibration component of the sensor unit.

9. The measuring system as recited in claim 8, wherein the function test is performed in a test mode of the sensor unit.

10. The measuring system as recited in claim 8, wherein the function test is performed while analyzing the natural frequency of the vibration component of the sensor unit.

11. The measuring system as recited in claim 8, wherein the function test is performed while analyzing a duration of the post-vibration process of the vibration component of the sensor unit.

12. The measuring system as recited in claim 8, wherein the function test is performed while analyzing an amplitude characteristic of the post-vibration process of the vibration component of the sensor unit.

13. The measuring system as recited in claim 10, wherein the result obtained from the function test is utilized for regulating the periodic excitation signal.

14. A distance measuring system for obstacle detection, comprising:
    an ultrasonic transmitter;
    an ultrasonic receiver;
    an excitation unit configured to achieve periodic excitation of the transmitter, wherein variable frequencies are used for the periodic excitation of the transmitter during a function test; and
    an evaluation unit configured to evaluate the signal from the receiver once the excitation unit has been switched off, wherein the function test is performed during the normal operation of the distance measuring system within a framework of a distance measuring routine.

* * * * *